US010051455B2

(12) United States Patent
Jeng et al.

(10) Patent No.: US 10,051,455 B2
(45) Date of Patent: Aug. 14, 2018

(54) SYSTEMS AND METHODS FOR CHANGING TOPOLOGY AND FIRMWARE IN DISTRIBUTED WI-FI NETWORKS

(71) Applicant: Plume Design, Inc., Palo Alto, CA (US)

(72) Inventors: Evan Jeng, Los Altos Hills, CA (US); Sameer Vaidya, Saratoga, CA (US); Paul White, Burlingame, CA (US); Kaixiang Hu, Fremont, CA (US); Hong Fan, San Jose, CA (US); Srinivasa Tagirisa, Cupertino, CA (US)

(73) Assignee: Plume Design, Inc., Palo Alto, CA (US)

( * ) Notice: Subject to any disclaimer, the term of this patent is extended or adjusted under 35 U.S.C. 154(b) by 0 days.

(21) Appl. No.: 15/463,647

(22) Filed: Mar. 20, 2017

(65) Prior Publication Data

US 2017/0272928 A1 Sep. 21, 2017

Related U.S. Application Data

(60) Provisional application No. 62/310,603, filed on Mar. 18, 2016.

(51) Int. Cl.
*H04W 8/00* (2009.01)
*H04L 29/08* (2006.01)
*H04B 7/155* (2006.01)
*H04W 84/12* (2009.01)

(52) U.S. Cl.
CPC ............ *H04W 8/005* (2013.01); *H04B 7/155* (2013.01); *H04L 67/10* (2013.01); *H04W 84/12* (2013.01)

(58) Field of Classification Search
CPC ...... H04W 8/005; H04W 84/12; H04L 67/10; H04B 7/155
See application file for complete search history.

(56) References Cited

U.S. PATENT DOCUMENTS

| 7,315,533 | B2 | 1/2008 | Theobold et al. |
| 7,414,978 | B2 | 8/2008 | Lun et al. |
| 7,953,403 | B2 | 5/2011 | Nientiedt |
| 8,798,021 | B2 | 8/2014 | Mangalvedhe et al. |
| 9,060,279 | B2 | 6/2015 | Ganu et al. |

(Continued)

*Primary Examiner* — Rina C Pancholi
(74) *Attorney, Agent, or Firm* — Clements Bernard Walker PLLC; Lawrence A. Baratta, Jr.

(57) ABSTRACT

Systems and methods include a cloud controller communicatively coupled to one or more distributed Wi-Fi networks and configured to manage the one or more distributed Wi-Fi networks. The cloud controller includes a network interface communicatively coupled to the distributed Wi-Fi networks; one or more processors communicatively coupled to the network interface; and memory storing instructions that, when executed, cause the one or more processors to: determine a new topology state for a topology of Wi-Fi network from a current topology state based on management of the Wi-Fi network; cause one or more nodes to change to new associated parent nodes based on the new topology state; cause an update to a configuration of the one or more nodes based on the new topology state; and continue to change additional nodes to new associated parent nodes based on the new topology state until the new topology state is obtained.

18 Claims, 11 Drawing Sheets

(56) References Cited

U.S. PATENT DOCUMENTS

| | | |
|---|---|---|
| 9,066,251 B2 | 6/2015 | Madan et al. |
| 9,131,391 B2 | 9/2015 | Madan et al. |
| 9,131,392 B2 | 9/2015 | Madan et al. |
| 9,420,528 B2 | 8/2016 | Madan et al. |
| 9,497,700 B2 | 11/2016 | Madan et al. |
| 9,510,214 B1 | 11/2016 | Balasubramaniam et al. |
| 9,516,579 B1 | 12/2016 | Diner et al. |
| 2006/0258395 A1 | 11/2006 | Cave et al. |
| 2007/0149172 A1 | 6/2007 | Dickinson |
| 2007/0169106 A1* | 7/2007 | Douglas ............... G06F 8/61 717/173 |
| 2007/0242621 A1 | 10/2007 | Nandagopalan et al. |
| 2009/0257380 A1 | 10/2009 | Meier |
| 2009/0279427 A1 | 11/2009 | Ji et al. |
| 2009/0285124 A1* | 11/2009 | Aguirre ............ H04L 45/122 370/255 |
| 2009/0316585 A1 | 12/2009 | Srinivasan |
| 2009/0323632 A1 | 12/2009 | Nix |
| 2011/0039554 A1 | 2/2011 | Bims |
| 2011/0151886 A1 | 6/2011 | Grayson et al. |
| 2012/0002567 A1 | 1/2012 | Sun et al. |
| 2012/0087268 A1 | 4/2012 | Savoor et al. |
| 2012/0122503 A1 | 5/2012 | Ma et al. |
| 2012/0257585 A1 | 10/2012 | Sydor et al. |
| 2013/0074061 A1* | 3/2013 | Averbuch ............ G06F 8/665 717/171 |
| 2013/0201857 A1 | 8/2013 | Bhargava et al. |
| 2013/0272285 A1 | 10/2013 | Goldsmith et al. |
| 2014/0036788 A1* | 2/2014 | Ganu ................ H04W 16/10 370/329 |
| 2014/0092765 A1 | 4/2014 | Agarwal et al. |
| 2014/0126410 A1 | 5/2014 | Agarwal et al. |
| 2014/0328190 A1 | 11/2014 | Lord et al. |
| 2015/0261519 A1* | 9/2015 | Hsieh ................... G06F 8/65 717/173 |
| 2016/0021546 A1* | 1/2016 | Cuervo ............. H04W 48/18 370/254 |
| 2016/0080949 A1 | 3/2016 | Chandrasekhar et al. |

\* cited by examiner

SYSTEMS AND METHODS FOR CHANGING TOPOLOGY AND FIRMWARE IN DISTRIBUTED WI-FI NETWORKS

CROSS-REFERENCE TO RELATED APPLICATION(S)

The present patent/application claims priority to U.S. Provisional Patent Application No. 62/310,603, filed Mar. 18, 2016, and entitled "METHODS FOR CHANGING TOPOLOGY AND FIRMWARE IN DISTRIBUTED WI-FI NETWORKS," the contents of which are incorporated by reference.

FIELD OF THE DISCLOSURE

The present disclosure generally relates to wireless networking systems and methods. More particularly, the present disclosure relates to methods of changing topology and firmware in distributed Wi-Fi networks.

BACKGROUND OF THE DISCLOSURE

Wi-Fi networks (i.e., Wireless Local Area Networks (WLAN) based on the IEEE 802.11 standards) have become ubiquitous. People use them in their homes, at work, and in public spaces such as schools, cafes, even parks. Wi-Fi provides great convenience by eliminating wires and allowing for mobility. The applications that consumers run over Wi-Fi is continually expanding. Today people use Wi-Fi to carry all sorts of media, including video traffic, audio traffic, telephone calls, video conferencing, online gaming, and security camera video. Often traditional data services are also simultaneously in use, such as web browsing, file upload/download, disk drive backups, and any number of mobile device applications. In fact, Wi-Fi has become the primary connection between user devices and the Internet in the home or other locations. The vast majority of connected devices use Wi-Fi for their primary network connectivity.

Despite Wi-Fi's popularity and ubiquity, many consumers still experience difficulties with Wi-Fi. The challenges of supplying real-time media applications, like those listed above, put increasing demands on the throughput, latency, jitter, and robustness of Wi-Fi. Studies have shown that broadband access to the Internet through service providers is up 99.9% of the time at high data rates. However, despite the Internet arriving reliably and fast to the edge of consumer's homes, simply distributing the connection across the home via Wi-Fi is much less reliable leading to poor user experience.

Several issues prevent conventional Wi-Fi systems from performing well, including i) interference, ii) congestion, and iii) coverage. For interference, with the growth of Wi-Fi has come the growth of interference between different Wi-Fi networks which overlap. When two networks within range of each other carry high levels of traffic, they interfere with each other, reducing the throughput that either network can achieve. For congestion, within a single Wi-Fi network, there may be several communications sessions running. When several demanding applications are running, such as high definition video streams, the network can become saturated, leaving insufficient capacity to support the video streams.

For coverage, Wi-Fi signals attenuate with distance and when traveling through walls and other objects. In many environments, such as residences, reliable Wi-Fi service cannot be obtained in all rooms. Even if a basic connection can be obtained in all rooms, many of those locations will have poor performance due to a weak Wi-Fi signal. Various objects in a residence such as walls, doors, mirrors, people, and general clutter all interfere and attenuate Wi-Fi signals leading to slower data rates.

Two general approaches have been tried to improve the performance of conventional Wi-Fi systems. The first approach is to simply build more powerful single access points, in an attempt to cover a location with stronger signal strengths, thereby providing more complete coverage and higher data rates at a given location. However, this approach is limited by both regulatory limits on the allowed transmit power, and by the fundamental laws of nature. The difficulty of making such a powerful access point, whether by increasing the power, or increasing the number of transmit and receive antennas, grows exponentially with the achieved improvement. Practical improvements using these techniques lie in the range of 6 to 12 dB. However, a single additional wall can attenuate by 12 dB. Therefore, despite the huge difficulty and expense to gain 12 dB of link budget, the resulting system may not be able to transmit through even one additional wall. Any coverage holes that may have existed will still be present, devices that suffer poor throughput will still achieve relatively poor throughput, and the overall system capacity will be only modestly improved. In addition, this approach does nothing to improve the situation with interference and congestion. In fact, by increasing the transmit power, the amount of interference between networks actually goes up.

A second approach is to use repeaters or a mesh of Wi-Fi devices to repeat the Wi-Fi data throughout a location. This approach is a fundamentally better approach to achieving better coverage. By placing even a single repeater node in the center of a house, the distance that a single Wi-Fi transmission must traverse can be cut in half, halving also the number of walls that each hop of the Wi-Fi signal must traverse. This can make a change in the link budget of 40 dB or more, a huge change compared to the 6 to 12 dB type improvements that can be obtained by enhancing a single access point as described above. Mesh networks have similar properties as systems using Wi-Fi repeaters. A fully interconnected mesh adds the ability for all the repeaters to be able to communicate with each other, opening the possibility of packets being delivered via multiple hops following an arbitrary pathway through the network.

State of the art mesh or repeaters systems still have many limitations. Because the systems depend on localized control, they configure themselves to use the same frequency for all the backhaul communication between the repeaters or mesh nodes. This creates a severe system capacity problem. Consider a system that requires three hops through the network to get its packet to the destination. Since all three hops are on the same frequency channel, and because only one Wi-Fi radio can transmit at a time on a given channel among devices that are in range (where the range is determined by the long range of the lowest supported data rate), only one hop can be active at a time. Therefore, for this example, delivering a packet via three hops would consume three times the airtime on the one channel as delivering the packet directly. In the first hop, when the packet is moving from the Wi-Fi gateway to the first mesh node, all the other links in the house would need to stay silent. Similarly, as the packet is later sent from the first mesh node to a second mesh node, no other Wi-Fi devices in the home could transmit. Finally, the same would be true as the packet is moved from the second mesh node to the final destination. In all, the use of three hop repeating has reduced the network capacity by a factor of three. And, as with the case of a single access point, the repeater or mesh approach does nothing to help with the problems of interference or congestion. As before, the technique actually increases interference, as a single packet transmission becomes three separate transmissions, taking a total of 3× the airtime, generating 3× the interference to neighboring Wi-Fi networks.

BRIEF SUMMARY OF THE DISCLOSURE

In an exemplary embodiment, a cloud controller communicatively coupled to one or more distributed Wi-Fi networks and configured to manage the one or more distributed Wi-Fi networks includes a network interface communicatively coupled to the one or more distributed Wi-Fi networks; one or more processors communicatively coupled to the network interface; and memory storing instructions that, when executed, cause the one or more processors to: determine a new topology state for a topology of a Wi-Fi network from a current topology state based on management of the Wi-Fi network; cause one or more nodes to change to new associated parent nodes based on the new topology state; cause an update to a configuration of the one or more nodes based on the new topology state; and continue to change one or more additional nodes to new associated parent nodes based on the new topology state until the new topology state is obtained. The topology can include a tree with a root node including a connection to a modem/router and children nodes including wireless backhaul links connected in the tree, wherein the topology defines the wireless backhaul links. The new topology state can be determined by an optimization performed by the cloud controller. The one or more nodes and the one or more additional nodes can be selected in a sequence based on associated number of hops to a root node. The one or more nodes can be selected based on a determination of which changes can be performed simultaneously.

The memory storing instructions that, when executed, can further cause the one or more processors to signal the one or more nodes and/or the one or more additional nodes to move their connections to either the new topology state or an intermediate topology state. Subsequent to the new topology state being formed, the memory storing instructions that, when executed, can further cause the one or more processors to cause additional changes including one or more of channel frequency and channel bandwidth. The memory storing instructions that, when executed, can further cause the one or more processors to, responsive to a new firmware/software version, determine the Wi-Fi network requires the new firmware/software version based on a current version of the plurality of nodes; push the new firmware/software version to each of the plurality of nodes; receive an acknowledgment that each of the plurality of nodes successfully received the new firmware/software version; and cause an update with the new firmware/software version by sending a message to each of the plurality of nodes in a sequence, wherein each of the plurality of nodes performs the update and reboots upon receipt of the message.

In another exemplary embodiment, a method for updating topology of a distributed Wi-Fi network including a plurality of nodes includes, responsive to determining a new topology state from a current topology state, causing one or more nodes to change to new associated parent nodes based on the new topology state; causing an update to a configuration of the one or more nodes based on the new topology state; and repeating causing one or more additional nodes to change to new associated parent nodes based on the new topology state until the new topology state is obtained. The topology can include a tree with a root node including a connection to a modem/router and children nodes including wireless backhaul links connected in the tree, wherein the topology defines the wireless backhaul links. The new topology state can be determined by an optimization performed by a cloud service configured to manage the distributed Wi-Fi network. The one or more nodes and the one or more additional nodes can be selected in a sequence based on associated number of hops to a root node. The method can further include performing an optimization by a cloud service communicatively coupled to the distributed Wi-Fi network; and performing the causing and repeating steps based on the optimization. The one or more nodes can be selected based on a determination of which changes can be performed simultaneously. The method can further include, subsequent to the new topology state being formed, causing additional changes including one or more of channel frequency and channel bandwidth.

In a further exemplary embodiment, a method for updating firmware/software of a distributed Wi-Fi network including a plurality of nodes in a topology includes, responsive to a new firmware/software version, determining the Wi-Fi network requires the new firmware/software version based on a current version of the plurality of nodes; pushing the new firmware/software version to each of the plurality of nodes concurrently; receiving an acknowledgment that each of the plurality of nodes successfully received the new firmware/software version; and causing an update with the new firmware/software version by sending a message to each of the plurality of nodes in a sequence, wherein each of the plurality of nodes performs the update and reboots upon receipt of the message. The topology can include a tree with a root node including a connection to a modem/router, and wherein the sequence can include an order based on a position in the tree. The method can be performed by a cloud service configured to manage the distributed Wi-Fi network. The determining can include recognizing which nodes are within a single network and ensuring all of the nodes are updated together or not at all. The method can further include preventing the causing the update responsive to any of the plurality of nodes failing to provide the acknowledgement.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, in various exemplary embodiments, the present disclosure relates to data gathering systems and methods to enable the optimization of distributed Wi-Fi networks. It is an objective of the systems and methods to provide a Wi-Fi network with superior performance relative to Wi-Fi networks with a single AP, with repeaters, or with multiple mesh nodes. The systems and methods include a distributed Wi-Fi system with a plurality of access points (nodes) which are self-optimizing based on cloud-based control. This self-optimization adapts the topology and configuration of the plurality of access points in real-time based on the operating environment. The plurality of access points communicate with one another via backhaul links and to Wi-Fi client devices via client links, and the each of the backhaul links and each of the client links may use different channels based on the optimization, thereby avoiding the aforementioned limitations in Wi-Fi mesh or repeater systems. In an exemplary aspect, the distributed Wi-Fi system includes a relatively large number of access points (relative to conventional deployments including Wi-Fi mesh or repeater systems). For example, the large number of access points can be 6 to 12 or more in a typical residence. With a large number of access points, the distance between any two access points is small, on a similar scale as the distance between an access point and Wi-Fi client device. Accordingly, signal strength is maintained avoiding coverage issues, and with the optimization of the topology and configuration, congestion and interference are minimized. Thus, the distributed Wi-Fi system addresses all three of the aforementioned limitations in conventional Wi-Fi systems.

Distributed Wi-Fi System

Figure 1:
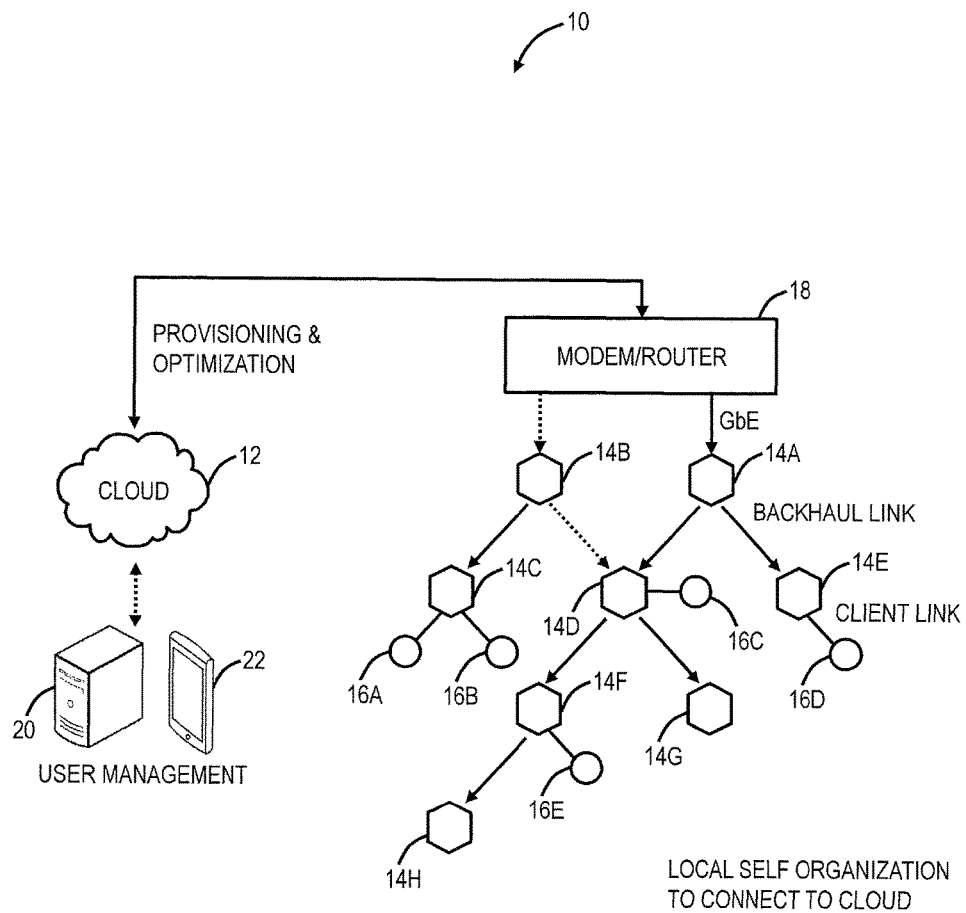
FIG. 1 is a network diagram of a distributed Wi-Fi system with cloud-based control.

Referring to FIG. 1, in an exemplary embodiment, a network diagram illustrates a Referring to FIG. 1, in an exemplary embodiment, a network diagram illustrates a distributed Wi-Fi system 10 with cloud-based 12 control. The distributed Wi-Fi system 10 can operate in accordance with the IEEE 802.11 protocols and variations thereof. The distributed Wi-Fi system 10 includes a plurality of access points 14 (labeled as access points 14A-14H) which can be distributed throughout a location, such as a residence, office, or the like. That is, the distributed Wi-Fi system 10 contemplates operation in any physical location where it is inefficient or impractical to service with a single access point, repeaters, or a mesh system. As described herein, the distributed Wi-Fi system 10 can be referred to as a network, a system, a Wi-Fi network, a Wi-Fi system, a cloud-based system, etc. The access points 14 can be referred to as nodes, access points, Wi-Fi nodes, Wi-Fi access points, etc. The objective of the access points 14 is to provide network connectivity to Wi-Fi client devices 16 (labeled as Wi-Fi client devices 16A-16E). The Wi-Fi client devices 16 can be referred to as client devices, user devices, clients, Wi-Fi clients, Wi-Fi devices, etc.

In a typical residential deployment, the distributed Wi-Fi system 10 can include between 3 to 12 access points or more in a home. A large number of access points 14 (which can also be referred to as nodes in the distributed Wi-Fi system 10) ensures that the distance between any access point 14 is always small, as is the distance to any Wi-Fi client device 16 needing Wi-Fi service. That is, an objective of the distributed Wi-Fi system 10 is for distances between the access points 14 to be of similar size as distances between the Wi-Fi client devices 16 and the associated access point 14. Such small distances ensure that every corner of a consumer's home is well covered by Wi-Fi signals. It also ensures that any given hop in the distributed Wi-Fi system 10 is short and goes through few walls. This results in very strong signal strengths for each hop in the distributed Wi-Fi system 10, allowing the use of high data rates, and providing robust operation. Note, those skilled in the art will recognize the Wi-Fi client devices 16 can be mobile devices, tablets, computers, consumer electronics, home entertainment devices, televisions, or any network-enabled device. For external network connectivity, one or more of the access points 14 can be connected to a modem/router 18 which can be a cable modem, Digital Subscriber Loop (DSL) modem, or any device providing external network connectivity to the physical location associated with the distributed Wi-Fi system 10.

While providing excellent coverage, a large number of access points 14 (nodes) presents a coordination problem. Getting all the access points 14 configured correctly and communicating efficiently requires centralized control. This control is preferably done on servers 20 that can be reached across the Internet (the cloud 12) and accessed remotely such as through an application ("app") running on a user device 22. The running of the distributed Wi-Fi system 10, therefore, becomes what is commonly known as a "cloud service." The servers 20 are configured to receive measurement data, to analyze the measurement data, and to configure the access points 14 in the distributed Wi-Fi system 10 based thereon, through the cloud 12. The servers 20 can also be configured to determine which access point 14 each of the Wi-Fi client devices 16 connect (associate) with. That is, in an exemplary aspect, the distributed Wi-Fi system 10 includes cloud-based control (with a cloud-based controller or cloud service) to optimize, configure, and monitor the operation of the access points 14 and the Wi-Fi client devices 16. This cloud-based control is contrasted with a conventional operation which relies on a local configuration such as by logging in locally to an access point. In the distributed Wi-Fi system 10, the control and optimization does not require local login to the access point 14, but rather the user device 22 (or a local Wi-Fi client device 16) communicating with the servers 20 in the cloud 12, such as via a disparate network (a different network than the distributed Wi-Fi system 10) (e.g., LTE, another Wi-Fi network, etc.).

The access points 14 can include both wireless links and wired links for connectivity. In the example of FIG. 1, the access point 14A has an exemplary gigabit Ethernet (GbE) wired connection to the modem/router 18. Optionally, the access point 14B also has a wired connection to the modem/router 18, such as for redundancy or load balancing. Also, the access points 14A, 14B can have a wireless connection to the modem/router 18. The access points 14 can have wireless links for client connectivity (referred to as a client link) and for backhaul (referred to as a backhaul link). The distributed Wi-Fi system 10 differs from a conventional Wi-Fi mesh network in that the client links and the backhaul links do not necessarily share the same Wi-Fi channel, thereby reducing interference. That is, the access points 14 can support at least two Wi-Fi wireless channels-which can be used flexibly to serve either the client link or the backhaul link and may have at least one wired port for connectivity to the modem/router 18, or for connection to other devices. In the distributed Wi-Fi system 10, only a small subset of the access points 14 require direct connectivity to the modem/router 18 with the non-connected access points 14 communicating with the modem/router 18 through the backhaul links back to the connected access points 14.

Distributed Wi-Fi System Compared to Conventional Wi-Fi Systems

Figure 2:
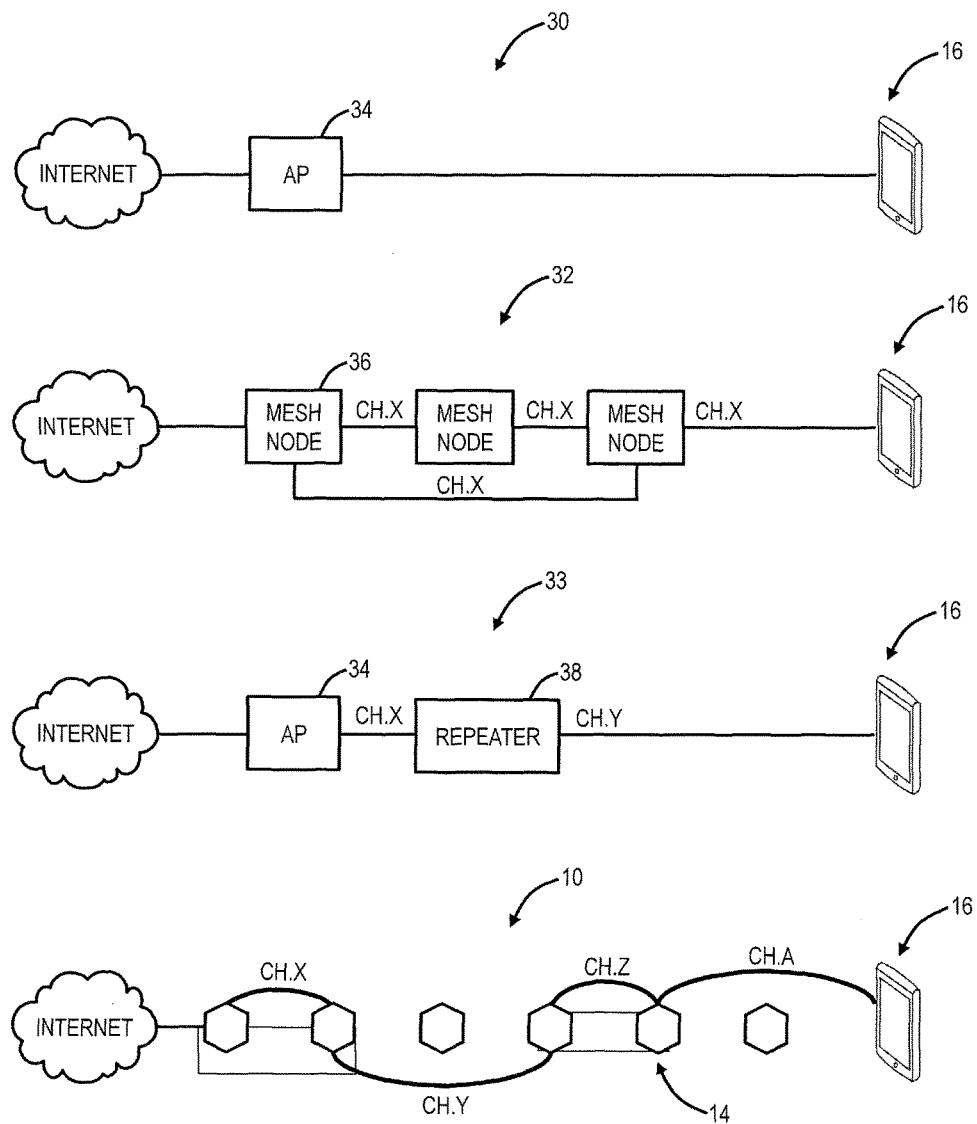
FIG. 2 is a network diagram of differences in operation of the distributed Wi-Fi system of FIG. 1 relative to a conventional single access point system, a Wi-Fi mesh network, and a Wi-Fi repeater system.

Referring to FIG. 2, in an exemplary embodiment, a network diagram illustrates differences in operation of the distributed Wi-Fi system 10 relative to a conventional single access point system 30, a Wi-Fi mesh network 32, and a Wi-Fi repeater network 33. The single access point system 30 relies on a single, high-powered access point 34 which may be centrally located to serve all Wi-Fi client devices 16 in a location (e.g., house). Again, as described herein, in a typical residence, the single access point system 30 can have several walls, floors, etc. between the access point 34 and the Wi-Fi client devices 16. Plus, the single access point system 30 operates on a single channel, leading to potential interference from neighboring systems. The Wi-Fi mesh network 32 solves some of the issues with the single access point system 30 by having multiple mesh nodes 36 which distribute the Wi-Fi coverage. Specifically, the Wi-Fi mesh network 32 operates based on the mesh nodes 36 being fully interconnected with one another, sharing a channel such as a channel X between each of the mesh nodes 36 and the Wi-Fi client device 16. That is, the Wi-Fi mesh network 32 is a fully interconnected grid, sharing the same channel, and allowing multiple different paths between the mesh nodes 36 and the Wi-Fi client device 16. However, since the Wi-Fi mesh network 32 uses the same backhaul channel, every hop between source points divides the network capacity by the number of hops taken to deliver the data. For example, if it takes three hops to stream a video to a Wi-Fi client device 16, the Wi-Fi mesh network 32 is left with only ⅓ the capacity. The Wi-Fi repeater network 33 includes the access point 34 coupled wirelessly to a Wi-Fi repeater 38. The Wi-Fi repeater network 33 is a star topology where there is at most one Wi-Fi repeater 38 between the access point 14 and the Wi-Fi client device 16. From a channel perspective, the access point 34 can communicate to the Wi-Fi repeater 38 on a first channel, Ch. X, and the Wi-Fi repeater 38 can communicate to the Wi-Fi client device 16 on a second channel, Ch. Y.

The distributed Wi-Fi system 10 solves the problem with the Wi-Fi mesh network 32 of requiring the same channel for all connections by using a different channel or band for the various hops (note, some hops may use the same channel/band, but it is not required), to prevent slowing down the Wi-Fi speed. For example, the distributed Wi-Fi system 10 can use different channels/bands between access points 14 and between the Wi-Fi client device 16 (e.g., Chs. X, Y, Z, A), and, also, the distributed Wi-Fi system 10 does not necessarily use every access point 14, based on configuration and optimization by the cloud 12. The distributed Wi-Fi system 10 solves the problems of the single access point system 30 by providing multiple access points 14. The distributed Wi-Fi system 10 is not constrained to a star topology as in the Wi-Fi repeater network 33 which at most allows two wireless hops between the Wi-Fi client device 16 and a gateway. Also, the distributed Wi-Fi system 10 forms a tree topology where there is one path between the Wi-Fi client device 16 and the gateway, but which allows for multiple wireless hops unlike the Wi-Fi repeater network 33.

Wi-Fi is a shared, simplex protocol meaning only one conversation between two devices can occur in the network at any given time, and if one device is talking the others need to be listening. By using different Wi-Fi channels, multiple simultaneous conversations can happen simultaneously in the distributed Wi-Fi system 10. By selecting different Wi-Fi channels between the access points 14, interference and congestion are avoided. The server 20 through the cloud 12 automatically configures the access points 14 in an optimized channel hop solution. The distributed Wi-Fi system 10 can choose routes and channels to support the ever-changing needs of consumers and their Wi-Fi client devices 16. The distributed Wi-Fi system 10 approach is to ensure Wi-Fi signals do not need to travel far—either for backhaul or client connectivity. Accordingly, the Wi-Fi signals remain strong and avoid interference by communicating on the same channel as in the Wi-Fi mesh network 32 or with Wi-Fi repeaters. In an exemplary aspect, the servers 20 in the cloud 12 are configured to optimize channel selection for the best user experience.

Configuration and Optimization Process for the Distributed Wi-Fi System

Figure 3:
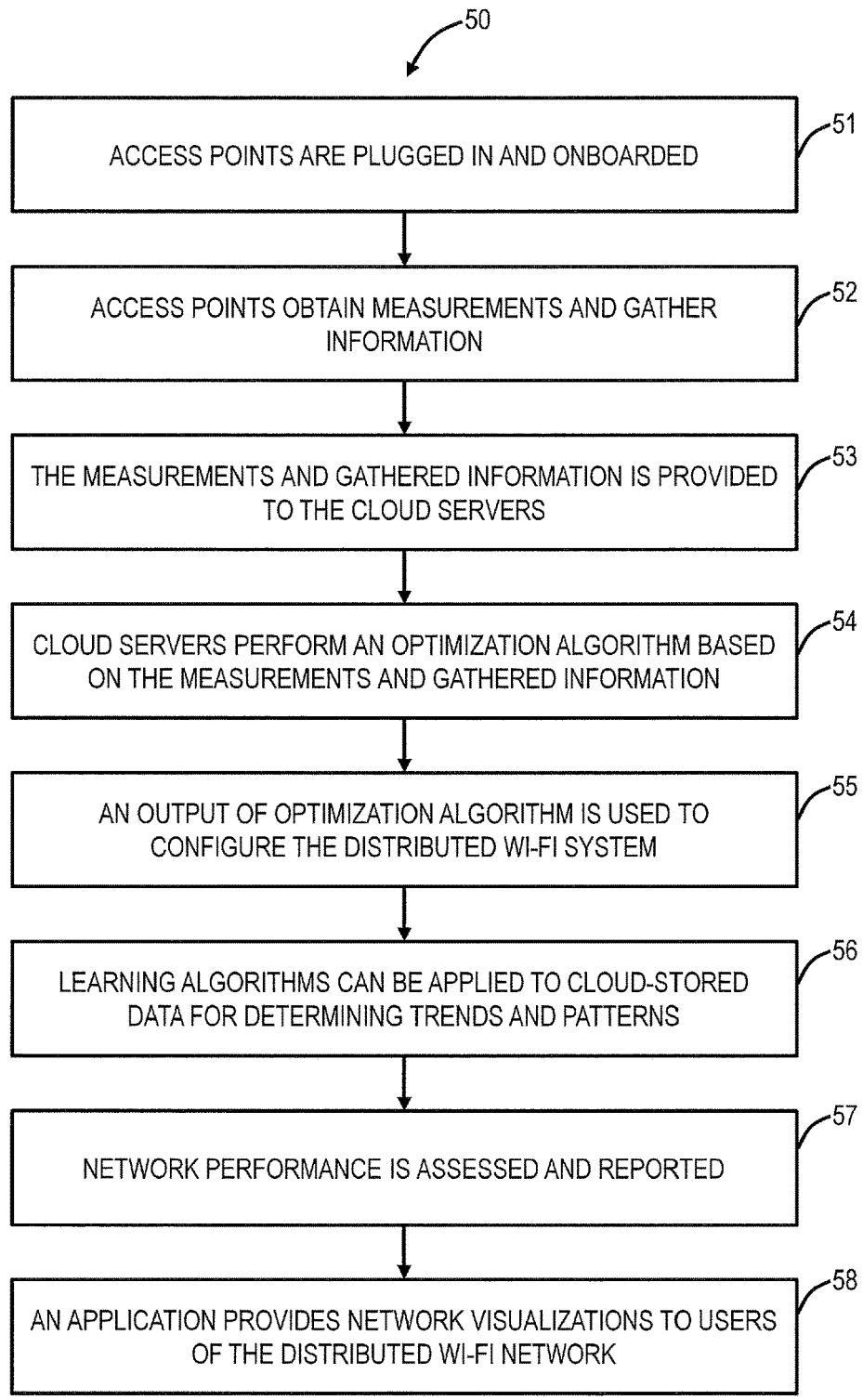
FIG. 3 is a flowchart of a configuration and optimization process for the distributed Wi-Fi system of FIG. 1.

Referring to FIG. 3, in an exemplary embodiment, a flowchart illustrates a configuration and optimization process 50 for the distributed Wi-Fi system 10. Specifically, the configuration and optimization process 50 includes various steps 51-58 to enable efficient operation of the distributed Wi-Fi system 10. These steps 51-58 may be performed in a different order and may be repeated on an ongoing basis, allowing the distributed Wi-Fi system 10 to adapt to changing conditions. First, each of the access points 14 are plugged in and onboarded (step 51). In the distributed Wi-Fi system 10, only a subset of the access points 14 are wired to the modem/router 18 (or optionally with a wireless connection to the modem/router 18), and those access points 14 without wired connectivity have to be onboarded to connect to the cloud 12. The onboarding step 51 ensures a newly installed access point 14 connects to the distributed Wi-Fi system 10 so that the access point can receive commands and provide data to the servers 20. The onboarding step 51 can include configuring the access point with the correct Service Set Identifier (SSID) (network ID) and associated security keys. In an exemplary embodiment, the onboarding step 51 is performed with Bluetooth or equivalent connectivity between the access point 14 and a user device 22 allowing a user to provide the SSID, security keys, etc. Once onboarded, the access point 14 can initiate communication with the distributed Wi-Fi system 10 to the servers 20 for configuration.

Second, the access points 14 obtain measurements and gather information to enable optimization of the networking settings (step 52). The information gathered can include signal strengths and supportable data rates between all nodes as well as between all nodes and all Wi-Fi client devices 16. Specifically, the measurement step 52 is performed by each access point 14 to gather data. Various additional measurements can be performed such as measuring an amount of interference, loads (throughputs) required by different applications operating over the distributed Wi-Fi system 10, etc. Third, the measurements and gathered information from the measurement step 52 is provided to the servers 20 in the cloud 12 (step 53). The steps 51-53 are performed on location at the distributed Wi-Fi system 10.

These measurements in steps 52, 53 could include traffic load required by each client, the data rate that can be maintained between each of the nodes and from each of the nodes to each of the clients, the packet error rates in the links between the nodes and between the nodes and the clients, and the like. In addition, the nodes make measurements of the interference levels affecting the network. This includes interference from other cloud controlled distributed Wi-Fi systems ("in-network interferers"), and interference coming from devices that are not part of the controllable network ("out-of-network interferers). It is important to make a distinction between these types of interferers. In-network interferers can be controlled by the cloud system, and therefore can be included in a large optimization over all in-network systems. Out of network interferers cannot be controlled from the cloud, and therefore their interference cannot be moved to another channel or otherwise changed. The system must adapt to them, rather than changing them. These out-of-network interferers include Wi-Fi networks that are not cloud controlled and non-Wi-Fi devices that transmit in the frequencies used by Wi-Fi such as Bluetooth devices, baby monitors, cordless phones, etc.

Another important input is the delay of packets traversing the network. These delays could be derived from direct measurements, time stamping packets as they arrive into the Wi-Fi network at the gateway, and measuring the elapsed time as they depart at the final node. However, such measurement would require some degree of time synchronization between the nodes. Another approach would be to measure the statistics of delay going through each node individually. The average total delay through the network and the distribution of the delays given some assumptions could then be calculated based on the delay statistics through each node individually. Delay can then become a parameter to be minimized in the optimization. It is also useful for the optimization to know the time that each node spends transmitting and receiving. Together with the amount of information transmitted or received, this can be used to determine the average data rate the various links are sustaining.

Fourth, the servers 20 in the cloud 12 use the measurements to perform an optimization algorithm for the distributed Wi-Fi system 10 (step 54). The optimization algorithm outputs the best parameters for the network operation. These include the selection of the channels on which each node should operate for the client links and the backhaul links, the bandwidth on each of these channels that the node should use, the topology of connection between the nodes and the routes for packets through that topology from any source to any destination in the network, the appropriate node for each client to attach to, the band on which each client should attach, etc.

Specifically, the optimization uses the measurements from the nodes as inputs to an objective function which is maximized. A capacity for each link can be derived by examining the amount of data that has been moved (the load), and the amount of time that the medium is busy due to interference. This can also be derived by taking a ratio of the data moved across the link to the fraction of the time that the transmitting queue was busy. This capacity represents the hypothetical throughput that could be achieved if the link was loaded to saturation and was moving as much data as it possibly could.

Fifth, an output of the optimization is used to configure the distributed Wi-Fi system 10 (step 55). The nodes and client devices need to be configured from the cloud based on the output of the optimization. Specific techniques are used to make the configuration fast, and to minimize the disruption to a network that is already operating. The outputs of the optimization are the operational parameters for the distributed Wi-Fi system 10. This includes the frequency channels on which each of the nodes is operating, and the bandwidth of the channel to be used. The 802.11ac standard allows for channel bandwidths of 20, 40, 80, and 160 MHz. The selection of the bandwidth to use is a tradeoff between supporting higher data rates (wide channel bandwidth), and having a larger number of different non-interfering channels to use in the distributed Wi-Fi system 10. The optimization tries to use the lowest possible channel bandwidth for each link that will support the load required by the various user's applications. By using the narrowest sufficient throughput channels, the maximum number of non-interfering channels are left over for other links within the distributed Wi-Fi system 10.

The optimization generates the outputs from the inputs as described above by maximizing an objective function. There are many different possible objective functions. One objective could be to maximize the total throughput provided to all the clients. This goal has the disadvantage that the maximum total throughput might be achieved by starving some clients completely, in order to improve the performance of clients that are already doing well. Another objective could be to enhance as much as possible the performance of the client in the network in the worst situation (maximize the minimum throughput to a client). This goal helps promote fairness but might trade a very large amount of total capacity for an incremental improvement at the worst client. A preferred approach considers the load desired by each client in a network, and maximizing the excess capacity for that load ratio. The optimization can improve the capacity, as well as shift the capacity between the two APs. The desired optimization is the one that maximizes the excess capacity in the direction of the ratio of the loads. This represents giving the distributed Wi-Fi system 10 the most margin to carry the desired loads, making their performance more robust, lower latency, and lower jitter. This strict optimization can be further enhanced by providing a softer optimization function that weighs assigning capacities with a varying scale. A high utility value would be placed on getting the throughput to be higher than the required load. Providing throughput to a client or node above the required load would still be considered a benefit, but would be weighted much less heavily than getting all the clients/nodes to the load they are requiring. Such a soft weighted optimization function allows for a more beneficial tradeoff of excess performance between devices.

Another set of optimization outputs defines the topology of the distributed Wi-Fi system 10, meaning which nodes connect to which other nodes. The actual route through the distributed Wi-Fi system 10 between two clients or the client and the Internet gateway (modem/router 18) is also an output of the optimization. Again, the optimization attempts to choose the best tradeoff in the route. Generally, traversing more hops makes each hop shorter range, higher data rate, and more robust. However, more hops add more latency, more jitter, and depending on the channel frequency assignments, takes more capacity away from the rest of the system.

Sixth, learning algorithms can be applied to cloud-stored data for determining trends and patterns (step 56). Note, the servers 20 can store the measurements from the nodes, results from the optimizations, and subsequent measurements after associated optimizations. With this data, trends and patterns can be determined and analyzed for various purposes. Because reconfiguring a network takes time and is always at least partially disruptive to active communication, it is beneficial to configure the network for peak load, before that peak load arrives. By learning from the historical data that has already been captured, it is possible to predict the usage and interference that will occur at a future time. Other uses of learning on the captured data include identifying bugs and discovering bugs in the behavior of client devices. Once bugs in the behavior of client devices are discovered, it may be possible to work around those bugs using tools and commands from the infrastructure side of the network.

Seventh, the performance of the network can be assessed and reported to the user or to a service provider whose services are running over Wi-Fi (step 57). Eighth, an application (such as a mobile app operating on the user device 22) can provide a user visibility into the network operation (step 58). This would include the display of network activity and performance metrics. The mobile app can be used to convey information to the user, make measurements, and allow the user to control certain aspects of Wi-Fi the network operation. The mobile app also communicates to the internet over the cellular system to assist in onboarding the nodes when they are first being set up. The mobile phone app, utilizing the cellular system, also provides a way for the Wi-Fi network to communicate with the internet and cloud when the user's normal internet connection is not functioning. This cellular based connection can be used to signal status, notify the service provider and other users, and can even be used to carry data from the home to the internet during the time that the user's normal internet connection is malfunctioning.

The configuration and optimization process 50 is described herein with reference to the distributed Wi-Fi system 10 as an exemplary embodiment. Those skilled in the art will recognize the configuration and optimization process 50 can operate with any type of multiple node Wi-Fi system (i.e., a distributed Wi-Fi network or Wi-Fi system) including the Wi-Fi mesh network 32, the Wi-Fi repeater network 33, etc. For example, cloud-based control can also be implemented in the Wi-Fi mesh network 32, the Wi-Fi repeater network 33, etc. and the various systems and methods described herein can operate as well here for cloud-based control and optimization. Also, the terminology "distributed Wi-Fi network" or "Wi-Fi system" can also apply to the Wi-Fi mesh network 32, the Wi-Fi repeater network 33, etc. whereas the distributed Wi-Fi system 10 is a specific embodiment of a distributed Wi-Fi network. That is the distributed Wi-Fi system 10 is similar to the Wi-Fi mesh network 32, the Wi-Fi repeater network 33, etc. in that it does support multiple nodes, but it does have the aforementioned distinctions to overcome limitations associated with each.

Optimization

Figure 4:
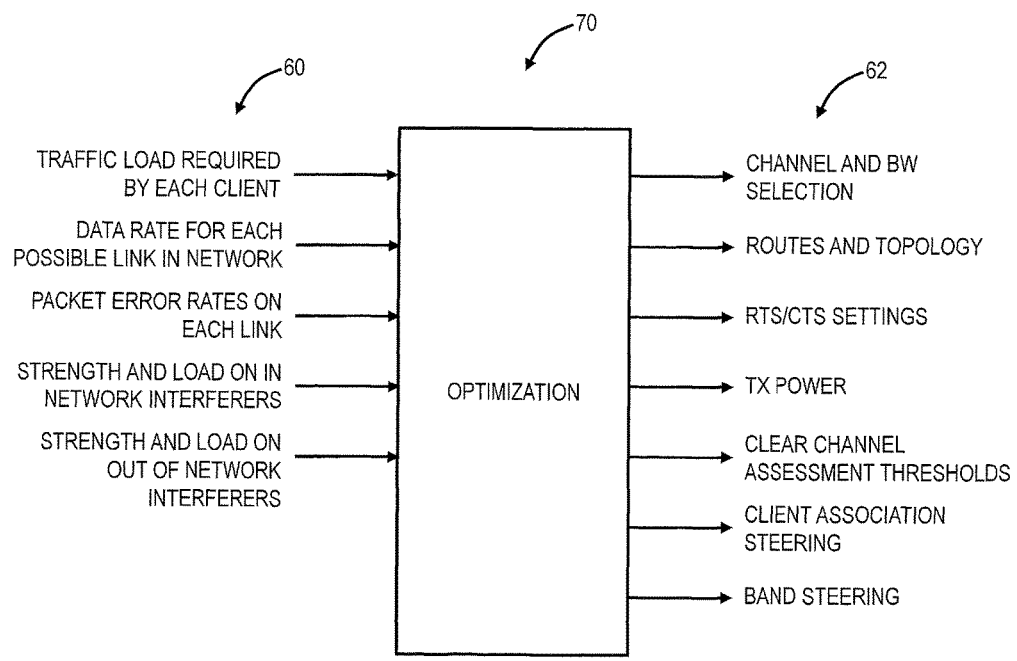
FIG. 4 is a block diagram of inputs and outputs to an optimization as part of the configuration and optimization process of FIG. 3.

Referring to FIG. 4, in an exemplary embodiment, a block diagram illustrates inputs 60 and outputs 62 to an optimization 70. The inputs 60 can include, for example, traffic load required by each client, signal strengths between nodes and between access points 14 (nodes) and Wi-fi client devices 16, data rate for each possible link in the network, packet error rates on each link, strength and load on in-network interferers, and strength and load on out-of-network interferers. Again, these inputs are based on measurements and data gathered by the plurality of access points 14 and communicated to the servers 20 in the cloud 12. The servers 20 are configured to implement the optimization 70. The outputs of the optimization 70 include, for example, channel and bandwidth (BW) selection, routes and topology, Request to Send/Clear to Send (RTS/CTS) settings, Transmitter (TX) power, clear channel assessment thresholds, client association steering, and band steering.

Access Point

Figure 5:
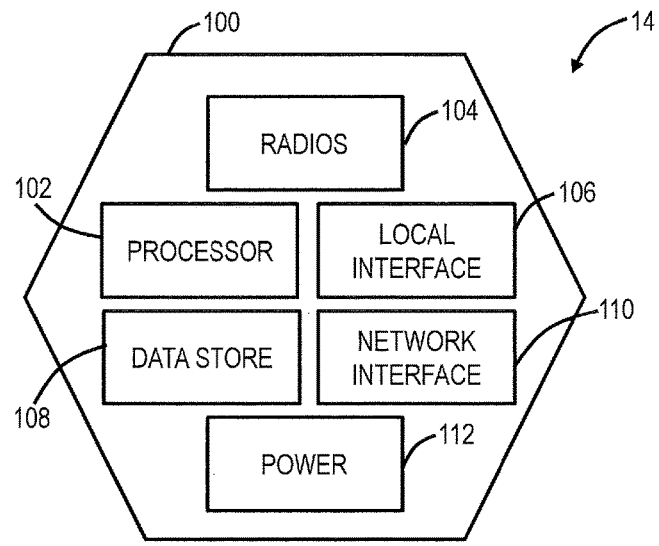
FIG. 5 is a block diagram of functional components of the access point in the distributed Wi-Fi system of FIG. 1.

Referring to FIG. 5, in an exemplary embodiment, a block diagram illustrates functional components of the access point 14 in the distributed Wi-Fi system 10. The access point 14 includes a physical form factor 100 which contains a processor 102, a plurality of radios 104, a local interface 106, a data store 108, a network interface 110, and power 112. It should be appreciated by those of ordinary skill in the art that FIG. 5 depicts the access point 14 in an oversimplified manner, and a practical embodiment may include additional components and suitably configured processing logic to support features described herein or known or conventional operating features that are not described in detail herein.

In an exemplary embodiment, the form factor 100 is a compact physical implementation where the access point 14 directly plugs into an electrical socket and is physically supported by the electrical plug connection to the electrical socket. This compact physical implementation is ideal for a large number of access points 14 distributed throughout a residence. The processor 102 is a hardware device for executing software instructions. The processor 102 can be any custom made or commercially available processor, a central processing unit (CPU), an auxiliary processor among several processors associated with the mobile device 300, a semiconductor-based microprocessor (in the form of a microchip or chip set), or generally any device for executing software instructions. When the access point 14 is in operation, the processor 102 is configured to execute software stored within memory or the data store 108, to communicate data to and from the memory or the data store 108, and to generally control operations of the access point 14 pursuant to the software instructions. In an exemplary embodiment, the processor 102 may include a mobile-optimized processor such as optimized for power consumption and mobile applications.

The radios 104 enable wireless communication in the distributed Wi-Fi system 10. The radios 104 can operate according to the IEEE 802.11 standard. The radios 104 include address, control, and/or data connections to enable appropriate communications on the distributed Wi-Fi system 10. As described herein, the access point 14 includes a plurality of radios to support different links, i.e., backhaul links and client links. The optimization 70 determines the configuration of the radios 104 such as bandwidth, channels, topology, etc. In an exemplary embodiment, the access points 14 support dual band operation simultaneously operating 2.4 GHz and 5 GHz 2×2 MIMO 802.11b/g/n/ac radios having operating bandwidths of 20/40 MHz for 2.4 GHz and 20/40/80 MHz for 5 GHz. For example, the access points 14 can support IEEE 802.11AC1200 gigabit Wi-Fi (300+867 Mbps).

The local interface 106 is configured for local communication to the access point 14 and can be either a wired connection or wireless connection such as Bluetooth or the like. Since the access points 14 are configured via the cloud 12, an onboarding process is required to first establish connectivity for a newly turned on access point 14. In an exemplary embodiment, the access points 14 can also include the local interface 106 allowing connectivity to the user device 22 (or a Wi-Fi client device 16) for onboarding to the distributed Wi-Fi system 10 such as through an app on the user device 22. The data store 108 is used to store data. The data store 108 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 108 may incorporate electronic, magnetic, optical, and/or other types of storage media.

The network interface 110 provides wired connectivity to the access point 14. The network interface 104 may be used to enable the access point 14 communicate to the modem/router 18. Also, the network interface 104 can be used to provide local connectivity to a Wi-Fi client device 16 or user device 22. For example, wiring in a device to an access point 14 can provide network access to a device which does not support Wi-Fi. In an exemplary embodiment, all of the access points 14 in the distributed Wi-Fi system 10 include the network interface 110. In another exemplary embodiment, select access points 14 which connect to the modem/router 18 or require local wired connections have the network interface 110. The network interface 110 may include, for example, an Ethernet card or adapter (e.g., 10 BaseT, Fast Ethernet, Gigabit Ethernet, 10 GbE). The network interface 110 may include address, control, and/or data connections to enable appropriate communications on the network.

The processor 102 and the data store 108 can include software and/or firmware which essentially controls the operation of the access point 14, data gathering and measurement control, data management, memory management, and communication and control interfaces with the server 20 via the cloud. The processor 102 and the data store 108 may be configured to implement the various processes, algorithms, methods, techniques, etc. described herein.

Cloud Server and User Device

Figure 6:
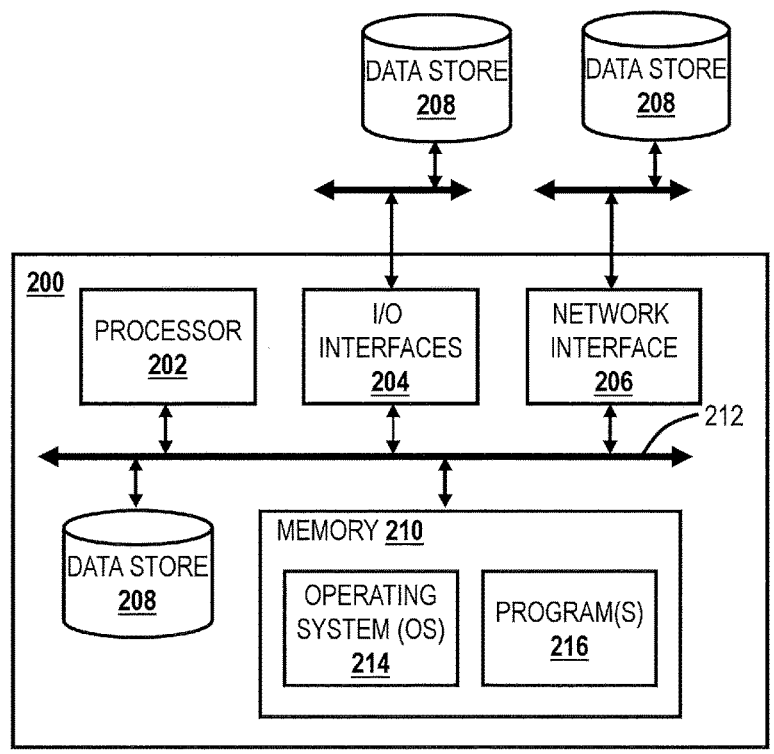
FIG. 6 is a block diagram of functional components of a server, a Wi-Fi client device, or a user device which may be used with the distributed Wi-Fi system of FIG. 1.

Referring to FIG. 6, in an exemplary embodiment, a block diagram illustrates functional components of the server 20, the Wi-Fi client device 16, or the user device 22 which may be used with the distributed Wi-Fi system 10. FIG. 6 illustrates functional components which can form any of the Wi-Fi client device 16, the server 20, the user device 22, or any general processing device. The server 20 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 6 depicts the server 20 in an oversimplified manner, and a practical embodiment may include additional components and suitably configured processing logic to support features described herein or known or conventional operating features that are not described in detail herein.

The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the server 20, a semiconductor-based microprocessor (in the form of a microchip or chip set), or generally any device for executing software instructions. When the server 20 is in operation, the processor 202 is configured to execute software stored within the memory 210, to communicate data to and from the memory 210, and to generally control operations of the server 20 pursuant to the software instructions. The I/O interfaces 204 may be used to receive user input from and/or for providing system output to one or more devices or components. User input may be provided via, for example, a keyboard, touchpad, and/or a mouse. System output may be provided via a display device and a printer (not shown). I/O interfaces 204 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 206 may be used to enable the server 20 to communicate on a network, such as the cloud 12. The network interface 206 may include, for example, an Ethernet card or adapter (e.g., 10 BaseT, Fast Ethernet, Gigabit Ethernet, 10 GbE) or a wireless local area network (WLAN) card or adapter (e.g., 802.11a/b/g/n/ac). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 20 such as, for example, an internal hard drive connected to the local interface 212 in the server 20. Additionally, in another embodiment, the data store 208 may be located external to the server 20 such as, for example, an external hard drive connected to the I/O interfaces 204 (e.g., SCSI or USB connection). In a further embodiment, the data store 208 may be connected to the server 20 through a network, such as, for example, a network attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein, such as related to the optimization 70.

Wi-Fi Topology

The systems and methods described herein provide techniques for orchestrating the realization of a target topology from an initial topology in a Wi-Fi network including a plurality of distributed access points 14. For example, the systems and methods contemplate operation with the distributed Wi-Fi system 10 as well as other distributed Wi-Fi networks such as the Wi-Fi mesh network 32, the Wi-Fi repeater network 33, etc. As described herein, a topology of the Wi-Fi network can be described by parent-child relationships between a set of nodes, i.e., access points 14. The topology may also optionally include the parent-child relationships of access points 14 with Wi-Fi client devices 16. The parent-child relationships can be the backhaul links and can include, for example, frequency bands, channels, and channel widths for each link. A topology change can be realized by issuing a set of commands to the nodes, such as by the cloud 12, the cloud controller, the cloud-based service, etc., instructing the access points 14 to configure the radios 104 to achieve the desired state. Commands may also be sent to the Wi-Fi client devices 16 to induce them to change channels, or connect to a different access point 14.

Figure 7:
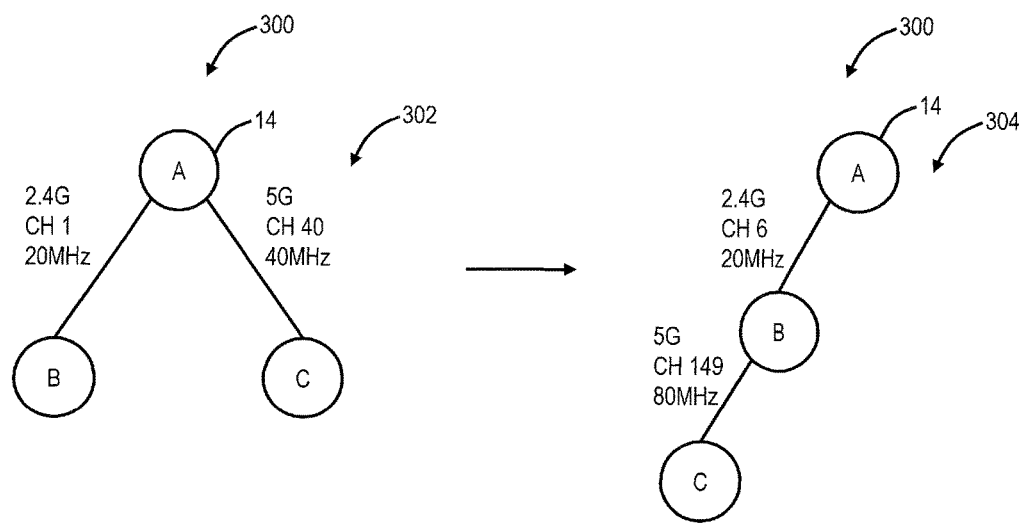
FIG. 7 is a network diagram of a three node Wi-Fi network in a first topology state and a second topology state.

Referring to FIG. 7, in an exemplary embodiment, a network diagram illustrates a three node Wi-Fi network 300 in a first topology state 302 and a second topology state 304. The Wi-Fi network 300 includes three access points 14, labeled as nodes A, B, C, with each operating a 2.4 G and a 5 G radio 104. In the first topology state 302, the node A is a parent node connected to node B on a backhaul link on the 2.4 G radio, Ch. 1, 20 MHz and to node C on a backhaul link on the 5 G radio, Ch. 40, 40 MHz. The Wi-Fi network 300 changes its topology to the second topology state 304 with the node A the parent node to the node B with a backhaul link on the 2.4 G radio, Ch. 6, 20 Hz, and the node B the parent node to the node C with a backhaul link on the 5 G radio, Ch. 149, 80 MHz.

Wi-Fi Topology Change Processes

Figure 8:
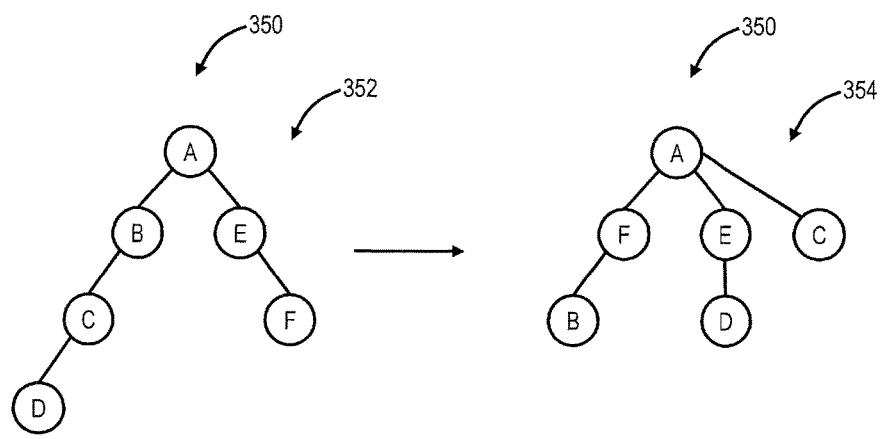
FIG. 8 is a network diagram of a six-node Wi-Fi network in a first topology state and a second topology state.
Figure 9:
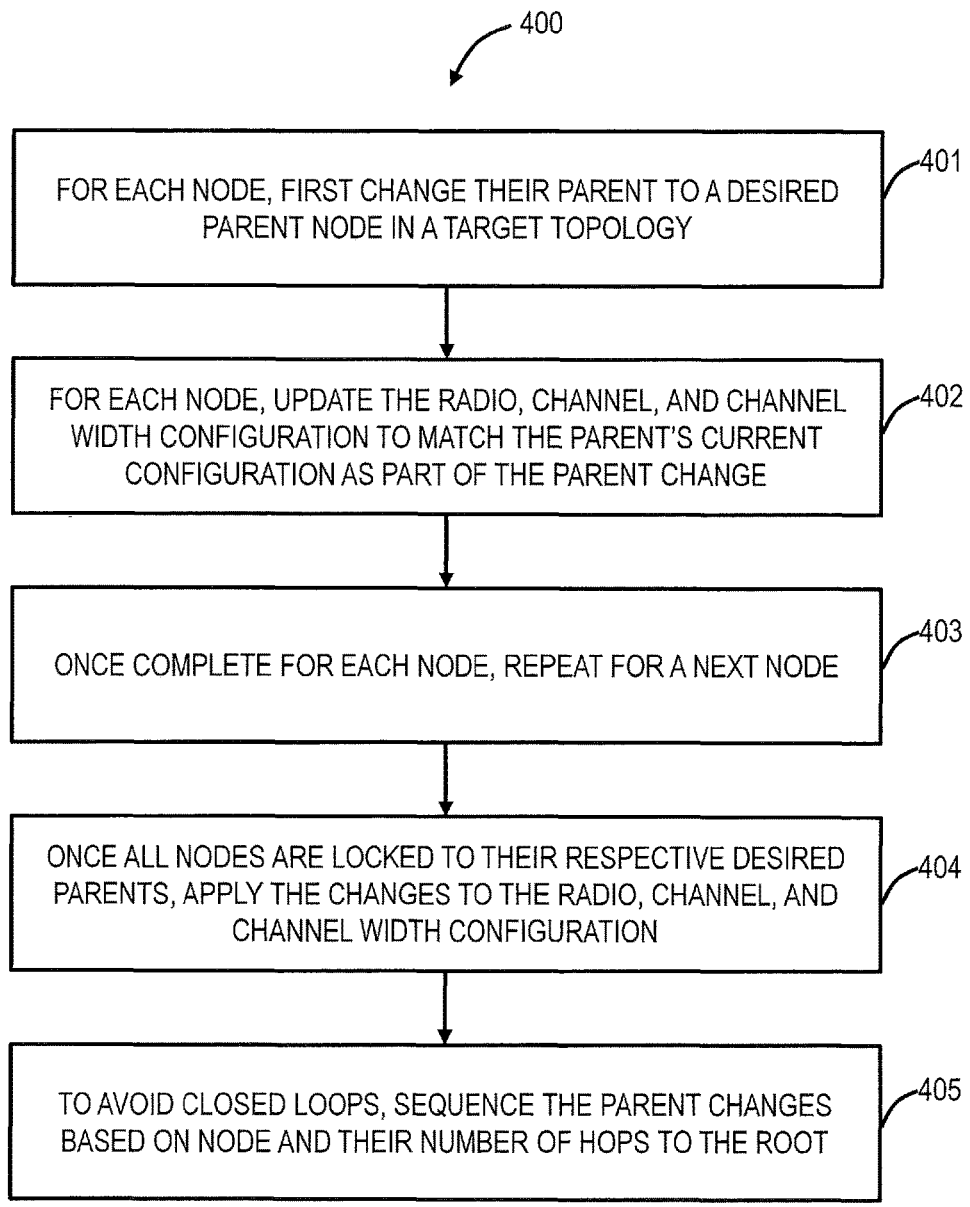
FIG. 9 is a flowchart of a first process for topology change in the Wi-Fi network of FIG. 8 performing operations sequentially.
Figure 10:
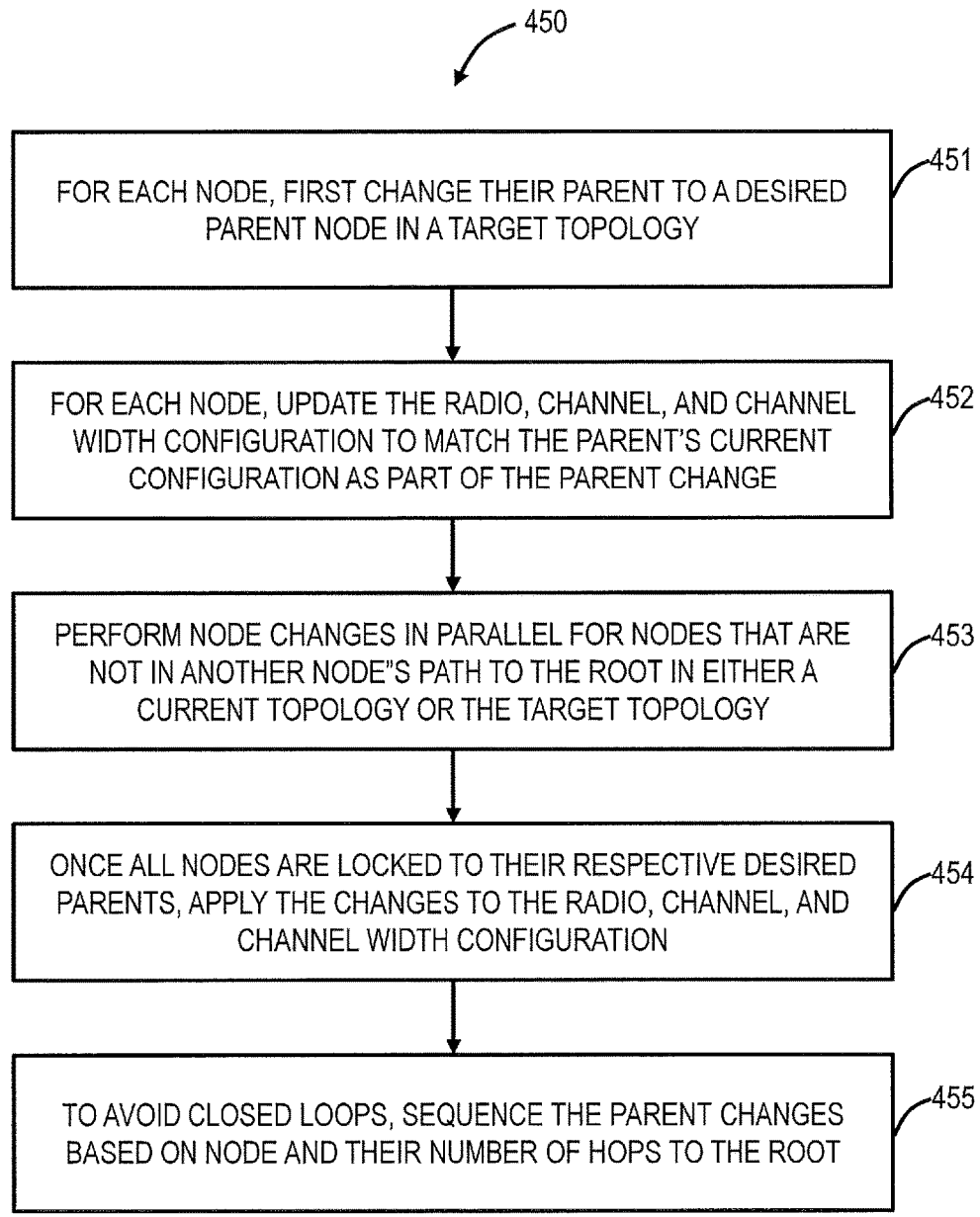
FIG. 10 is a flowchart of a second process for topology change in the Wi-Fi network of FIG. 8 performing parallel changes.
Figure 11:
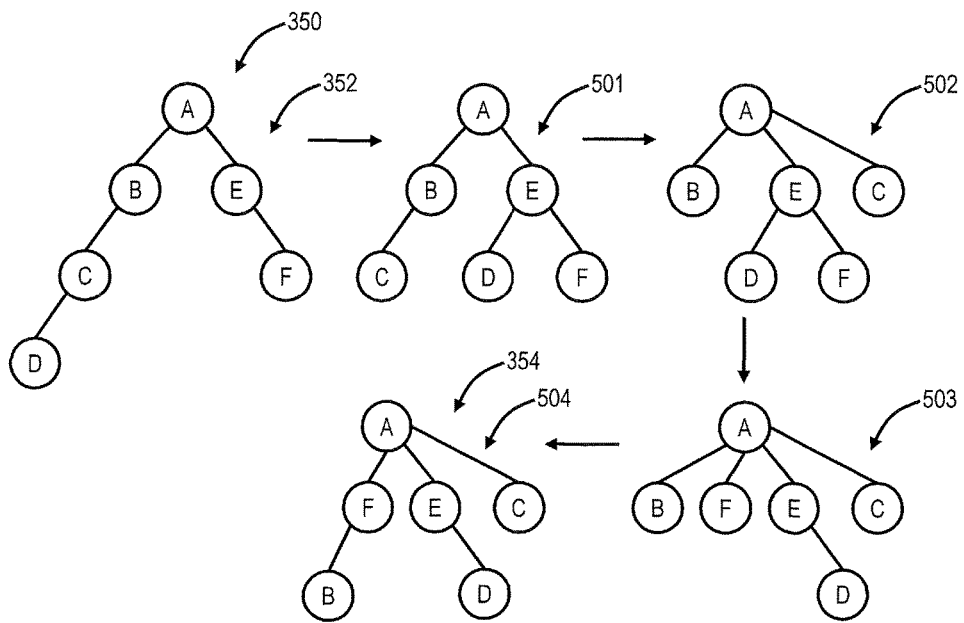
FIG. 11 is a network diagram of the Wi-Fi network of FIG. 8 and an exemplary operation of the first process of FIG. 9.
Figure 12:
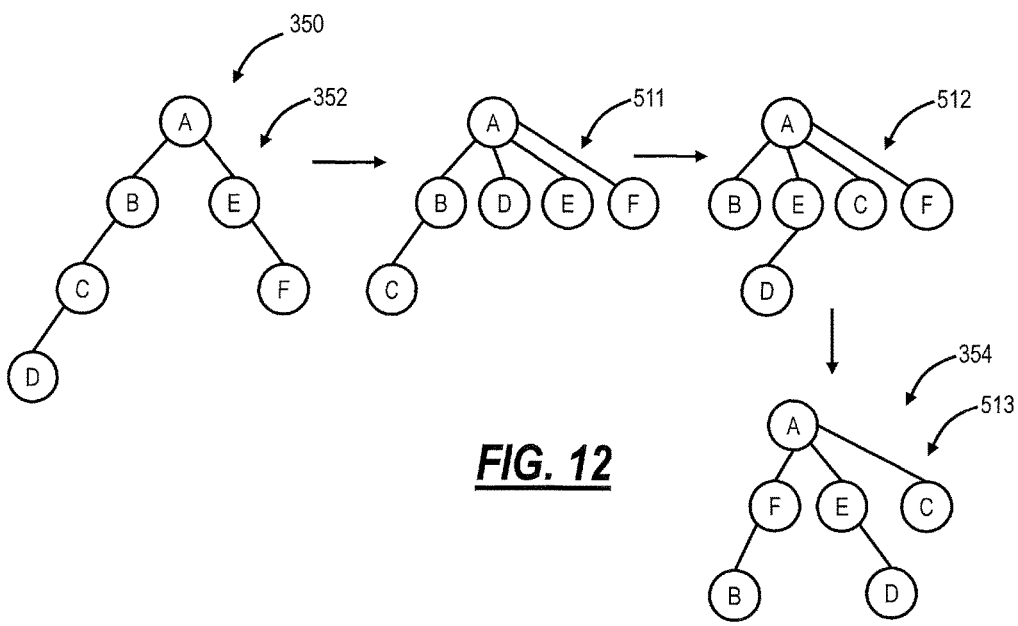
FIG. 12 is a network diagram of the Wi-Fi network of FIG. 8 and an exemplary operation of the second process of FIG. 10.

Referring to FIG. 8, in an exemplary embodiment, a network diagram illustrates a six node Wi-Fi network 350 in a first topology state 352 and a second topology state 354. The Wi-Fi network 350 includes six nodes A-F. Referring to FIG. 9, in an exemplary embodiment, a flowchart illustrates a first process 400 for topology change in the Wi-Fi network 350 performing operations sequentially. Referring to FIG. 10, in an exemplary embodiment, a flowchart illustrates a second process 450 for topology change in the Wi-Fi network 350 performing parallel changes. Referring to FIG. 11, in an exemplary embodiment, a network diagram illustrates the Wi-Fi network 350 and an exemplary operation of the first process 400. Referring to FIG. 12, in an exemplary embodiment, a network diagram illustrates the Wi-Fi network 350 and an exemplary operation of the second process 450.

The first process 400 includes, for each node, first change their parent to the desired parent node in the target topology, i.e., the second topology state 354 (step 401). If necessary, the radio, channel, and channel width configuration is updated to match the target parent's current configuration as part of the parent change command (step 402). The first process 400 includes waiting until the parent change finishes before moving to the next node to repeat steps 401, 402 (step 403). Once all nodes are locked to their respective desired parents, the desired radio, channels, and channel width configurations are applied for all the nodes (step 404). To avoid forming closed loops with no path to the root node/Internet (i.e., through the gateway node), the parent changes can be sequenced starting with nodes that have the greatest number of hops to the root (step 405).

The second process 450 is similar to the first process 400 with optimization. Specifically, the second process 450 includes, for each node, first change their parent to the desired parent node in the target topology, i.e., the second topology state 354 (step 451). If necessary, the radio, channel, and channel width configuration is updated to match the target parent's current configuration as part of the parent change command (step 452). Instead of performing the operations in steps 451, 452 sequentially, i.e., "one at a time," the second process 450 includes an optimization to reduce the overall time taken to realize the target topology state 354. The second process 450 includes performing sets of compatible operations in parallel (step 453). A set of parent change operations is compatible if for the set of nodes to be operated on, no node can be in another node's path to the root in the either the current topology or the target topology. This ensures that each node maintains connectivity to the Internet immediately before and after each operation. Once all nodes are locked to their respective desired parents, the desired radio, channels, and channel width configurations are applied to all the nodes (step 454). To avoid forming closed loops with no path to the root node/Internet (i.e., through the gateway node), the parent changes can be sequenced starting with nodes that have the greatest number of hops to the root (step 455).

FIG. 11 illustrates an operation of the first process 400. First, the Wi-Fi network 350 is in the first topology state 352. In the first process 400, the Wi-Fi network 350 goes through four steps 501, 502, 503, 504 between the first topology state 352 and the second topology state 354. First, in step 501, the first node selected, node D, is switched from its current parent node C to its new parent node E. Second, in step 502, the second node selected, node C, is switched from its current parent node B to its new parent node A. Third, in step 503, the third node selected, node F, is switched from its current parent node E to its new parent node A. Finally, in step 504, the fourth node selected, node B, is switched from its current parent node A to its new parent node F. After step 504, the Wi-Fi network 350 is now in the target topology, i.e., the second topology state 354. Note, the nodes are switched from current parent nodes to the new, desired parent nodes when they have no child nodes. The nodes are moved sequentially, one-at-a-time. The first process 400 can select each node to be moved at each step by selecting the node furthest from the root (by a number of hops) with no children.

FIG. 12 illustrates an operation of the second process 450. Again, the Wi-Fi network 350 starts in the first topology state 352. In the second process 450, the Wi-Fi network 350 goes through three steps 511, 512, 513 between the first topology state 352 and the second topology state 354, i.e., the second process 450 eliminates a step from the first process 400 through the optimization. First, in step 511, a group of nodes is selected including nodes D, F to move concurrently since neither node D or node F is on the same path to the root node A in either the original or final topology. The nodes D, F are moved to their new parent node A. Second, in step 512, a groups of nodes is selected including nodes C, D to move concurrently since neither node C or node D is on the same path to the root node A.

Finally, in step 512, node B is selected and moved to its new parent node F. After step 513, the Wi-Fi network 350 is now in the target topology, i.e., the second topology state 354.

With respect to steps 404, 454, in an exemplary embodiment, the node movement in the steps 403, 453 can initially be performed by having the child node associate or connect to the new parent node with current settings, i.e., radio, channel, and channel width. The newly selected settings, i.e., radio, channel, and channel width, can be applied at once while the Wi-Fi network 350 is in the new topology state 352. Accordingly, connectivity remains in the Wi-Fi network 350 during the topology change processes 400, 450. That is, there is always a path to the root in the Wi-Fi network 350 since the nodes are moved child by child with the children being moved having no children of their own as they are moved. Also, the cloud service and/or the Wi-Fi network 350 can move any Wi-Fi client devices 16 prior to moving a node, further ensuring no data loss due to the topology change. Further, the topology change processes 400, 450 can be implemented during low load times, e.g., late night.

Firmware/Software Updates

Figure 13:
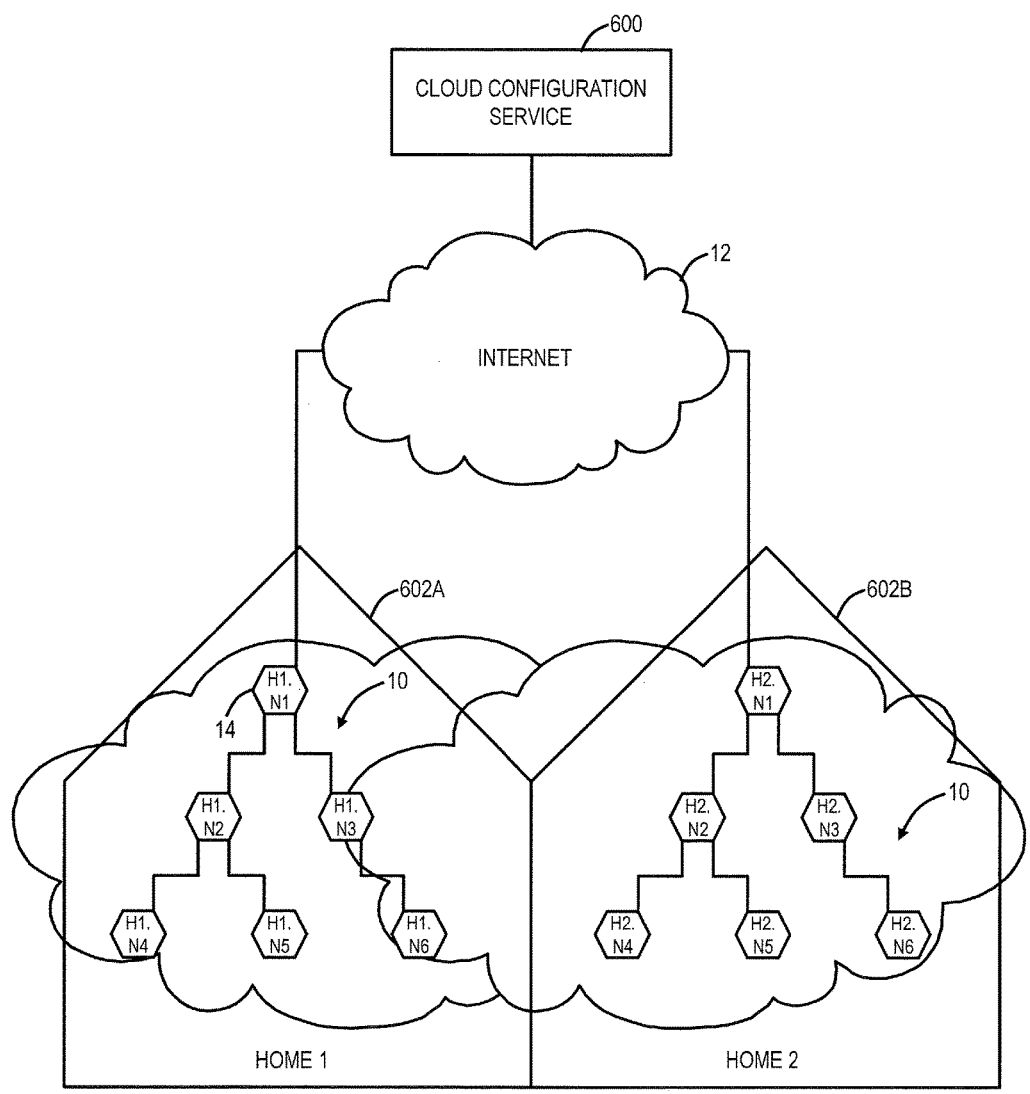
FIG. 13 is a network diagram of firmware updates via a cloud configuration service connected to one or more distributed Wi-Fi systems.

Referring to FIG. 13, in an exemplary embodiment, a network diagram illustrates firmware updates via a cloud configuration service 600 connected to one or more distributed Wi-Fi systems 10. A closely related problem to the topology change problem is how to update the firmware/software on all devices in the network (e.g., the distributed Wi-Fi system 10 or any other distributed Wi-Fi network). Similar to the topology change problem, it is important to update the firmware/software in the devices in a sequence that ensures that the network will not get trapped mid-way through the procedure, or that some nodes will be left out of the updating process.

In FIG. 13, there are two locations 602A, 602B, i.e., residences, etc., each with a distributed Wi-Fi system 10 with a plurality of access points 14 (nodes labeled as H1.N1, H1, N2, etc. where H is the home and N is the node number). Again, the various systems and methods described herein contemplate use with the distributed Wi-Fi system 10 as well as other types of Wi-Fi networks. The distributed Wi-Fi network is provided by several nodes at the locations 602A, 602B that are managed by the cloud configuration service 600, and must work in unison within a home, and in some instances work cooperatively between homes. In order to eliminate problems related to version mismatches, it is imperative that firmware versions of all the nodes within a location (e.g. 602A, 602B), and in some cases even across locations, get upgraded in a transactional all-or-nothing manner. Accordingly, the approach must ensure "no node is left behind."

Figure 14:
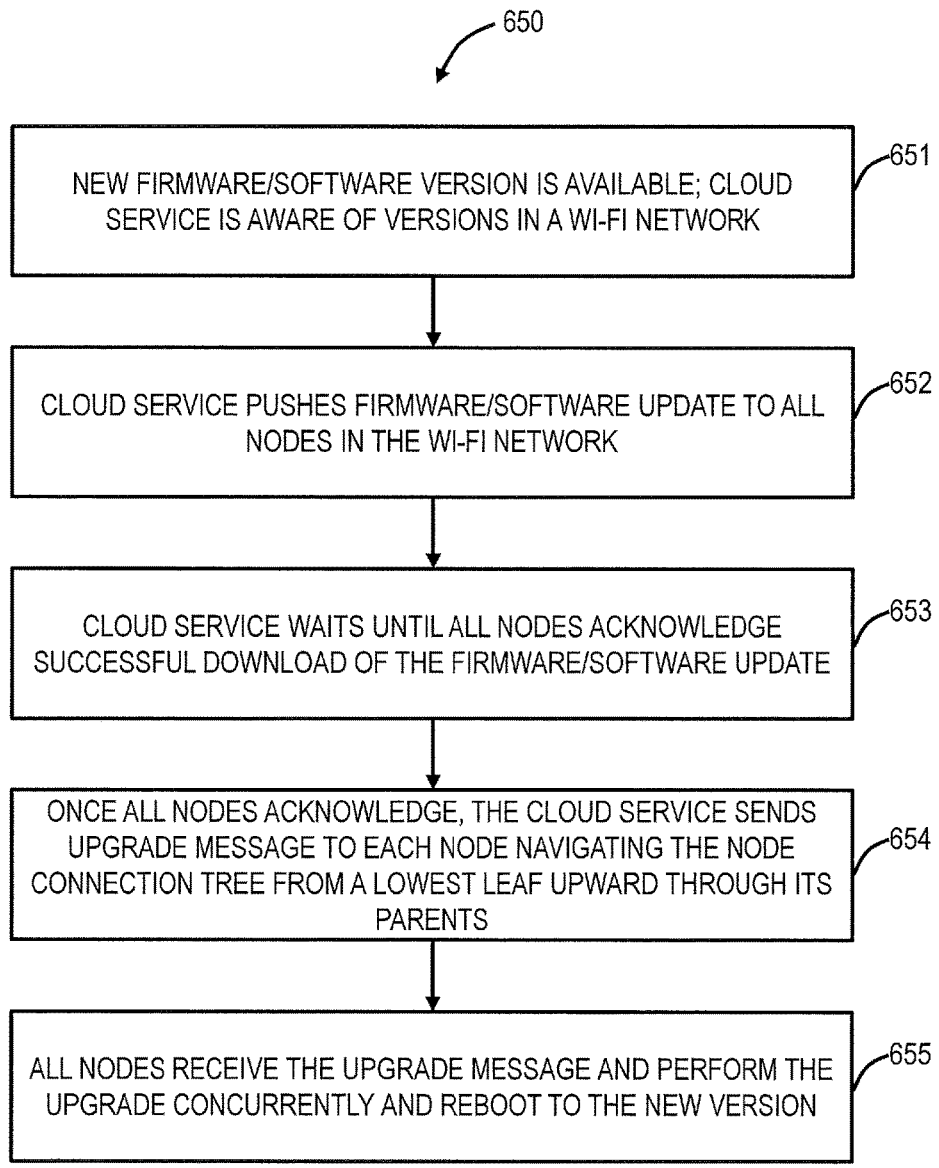
FIG. 14 is a flowchart of a firmware upgrade process for distributed Wi-Fi networks.

Referring to FIG. 14, in an exemplary embodiment, a flowchart illustrates a firmware upgrade process 650 for distributed Wi-Fi networks. The firmware updates are provided by the cloud configuration service 600 via the cloud 12. These upgrades can be referred to as Over The Air (OTA) firmware upgrades to all nodes within a location 602. The firmware upgrade process 650 uses the concept of two-phase commit—wherein the first phase (prepare-to-commit) which is more complicated and prone to failure, is completed across all nodes before a second phase performs a very quick transaction commit applied in succession to all nodes in the order that minimizes the probability of failure.

The cloud configuration service 602 can also be referred to or include an OTA firmware update service (or simply OTA service). The cloud configuration service 602 has a priori knowledge of which nodes H1.N1, etc. belong together in the location 602. That is, the cloud configuration service 602 can include a registry or database of which Wi-Fi networks are under its control, which nodes are associated with each Wi-Fi network and operational parameters of the nodes including current firmware/software versions.

The upgrade process 650 includes a new firmware/software version becoming available and the cloud configuration service 602 being aware of which nodes require this version (step 651). For example, an administrator prepares a new version (e.g., v 0.2) and initiates an OTA service process to upgrade nodes from a previous version (e.g., v 0.1) to the new version (e.g., v 0.2). The cloud configuration service 602 pushes the firmware/software update to all nodes in a Wi-Fi network (step 652). The upgrade process 650 can operate on different locations 602A, 602B simultaneously. For example, the OTA service first pushes firmware update image to all nodes—this is a time-consuming activity prone to failure. This is equivalent to "prepare-to-commit" or the first phase of the two-phase commit protocol.

The cloud configuration service 602 waits until all node acknowledge successful download of the firmware/software update to all nodes in the Wi-Fi network (step 653). This is equivalent to "prepared-to-commit" or successful completion of the first phase of the two-phase commit protocol. Note, if any of the nodes fail to download the firmware/software update, the upgrade process 650 will not upgrade any of the nodes within that Wi-Fi network. For example, the upgrade process 650 can repeat from step 652 if any node fails to download.

Once all nodes successfully acknowledge completion of the first phase of the two-phase commit protocol, the cloud configuration service 602 sends an upgrade message to each node in a sequence or group which navigates the sending based on a node connection tree of the Wi-Fi network from the lowest leaf upward through its parents (step 654). The navigation of sending the upgrade messages ensures no node will disconnect within the second phase of the two-phase commit protocol. All nodes receive the upgrade message and perform the upgrade concurrently and reboot to the new version (step 655).

All nodes within the location 602 have to collaborate and work together with the same versions of services 602 running in the cloud 12. When cloud service versions evolve, firmware/software on all nodes has to be evolved to match the capabilities of cloud service. This two-phase commit upgrade process 650 ensures that all nodes within a location 602 will upgrade to the same version together, and minimize or eliminate the risk of nodes failing due to version mismatch.

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various exemplary embodiments.

Moreover, some exemplary embodiments may include a non-transitory computer readable storage medium having computer readable code stored thereon for programming a computer, server, appliance, device, processor, circuit, etc. each of which may include a processor to perform functions as described and claimed herein. Examples of such computer readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A cloud controller communicatively coupled to one or more distributed Wi-Fi networks and configured to manage the one or more distributed Wi-Fi networks, the cloud controller comprising:
   a network interface communicatively coupled to the one or more distributed Wi-Fi networks;
   one or more processors communicatively coupled to the network interface; and
   memory storing instructions that, when executed, cause the one or more processors to:
      determine a new topology state for a topology of a Wi-Fi network from a current topology state based on management of the Wi-Fi network, wherein the topology defines how nodes which are access points in the Wi-Fi network connect to one another via backhaul links each with associated wireless characteristics, wherein at least two access points rely exclusively on the backhaul links for network connectivity to a modem/router, and wherein the backhaul links are configured with at least two backhaul links having a different channel or band from one another;
      cause a plurality of nodes to change to new associated parent nodes based on the new topology state, wherein the plurality of nodes are selected based on their path to the modem/router being different from one another which enables the change to be performed simultaneously;
      cause an update to a configuration of the plurality of nodes based on the new topology state; and
      continue to change one or more additional nodes to new associated parent nodes based on the new topology state until the new topology state is obtained, wherein the Wi-Fi network continues to provide connectivity to Wi-Fi client devices while the topology is changed.

2. The cloud controller of claim 1, wherein the topology comprises a tree with a root node comprising a connection to a modem/router and children nodes comprising wireless backhaul links connected in the tree, wherein the topology defines the wireless backhaul links.

3. The cloud controller of claim 1, wherein the new topology state is determined by an optimization performed by the cloud controller.

4. The cloud controller of claim 1, wherein the plurality of nodes and the one or more additional nodes are selected in a sequence based on associated number of hops to a root node.

5. The cloud controller of claim 1, wherein the memory storing instructions that, when executed, further cause the one or more processors to:
   signal the plurality of nodes and/or the one or more additional nodes to move their connections to either the new topology state or an intermediate topology state.

6. The cloud controller of claim 1, wherein, subsequent to the new topology state being formed, the memory storing instructions that, when executed, further cause the one or more processors to:
   cause additional changes comprising one or more of channel frequency and channel bandwidth.

7. The cloud controller of claim 1, wherein the memory storing instructions that, when executed, further cause the one or more processors to:
   responsive to a new firmware/software version, determine the Wi-Fi network requires the new firmware/software version based on a current version of another plurality of nodes in the one or more distributed Wi-Fi networks;
   push the new firmware/software version to each of the another plurality of nodes;
   receive an acknowledgment that each of the another plurality of nodes successfully received the new firmware/software version; and
   cause an update with the new firmware/software version by sending a message to each of the another plurality of nodes in a sequence, wherein each of the another plurality of nodes updates and reboots upon receipt of the message.

8. A method for updating topology of a distributed Wi-Fi network comprising a plurality of nodes, the method comprising:
   responsive to determining a new topology state from a current topology state, causing a plurality of nodes to change to new associated parent nodes based on the new topology state, wherein each of the new topology state and the current topology state define how nodes which are access points in the distributed Wi-Fi network connect to one another via backhaul links each with associated wireless characteristics, wherein at least two access points rely exclusively on the backhaul links for network connectivity to a modem/router, wherein the backhaul links are configured with at least two backhaul links having a different channel or band from one another, and wherein the plurality of nodes are selected based on their path to the modem/router being different from one another which enables the change to be performed simultaneously;

causing an update to a configuration of the plurality of nodes based on the new topology state; and repeating causing one or more additional nodes to change to new associated parent nodes based on the new topology state until the new topology state is obtained, wherein the distributed Wi-Fi network continues to provide connectivity to Wi-Fi client devices during the causing and the repeating causing.

9. The method of claim 8, wherein the topology comprises a tree with a root node comprising a connection to a modem/router and children nodes comprising wireless backhaul links connected in the tree, wherein the topology defines the wireless backhaul links.

10. The method of claim 8, wherein the new topology state is determined by an optimization performed by a cloud service configured to manage the distributed Wi-Fi network.

11. The method of claim 8, wherein the plurality of nodes and the one or more additional nodes are selected in a sequence based on associated number of hops to a root node.

12. The method of claim 8, further comprising:
performing an optimization by a cloud service communicatively coupled to the distributed Wi-Fi network; and
performing the causing an update step and the repeating step based on the optimization.

13. The method of claim 8, further comprising:
subsequent to the new topology state being formed, causing additional changes comprising one or more of channel frequency and channel bandwidth.

14. A method for updating firmware/software of a distributed Wi-Fi network comprising a plurality of nodes in a topology, the method comprising:
responsive to a new firmware/software version, determining the distributed Wi-Fi network requires the new firmware/software version based on a current version of the plurality of nodes, wherein the topology defines how the plurality of nodes which are access points connect to one another via backhaul links each with associated wireless characteristics, wherein at least two access points rely exclusively on the backhaul links for network connectivity to a modem/router, wherein the backhaul links are configured with at least two backhaul links having a different channel or band from one another, and wherein the distributed Wi-Fi network utilizes a cloud controller for management thereof which is external and connected through the modem/router to each of the at least two access points;
pushing the new firmware/software version to each of the plurality of nodes concurrently;
receiving an acknowledgment that each of the plurality of nodes successfully received the new firmware/software version; and
responsive to the acknowledgement from each of the plurality of nodes, causing an update with the new firmware/software version by sending a message to each of the plurality of nodes in a sequence based on each node's position in the topology to ensure all nodes receive the message prior to any node initiating the update, wherein each of the plurality of nodes performs the update and reboots upon receipt of the message, and wherein the sequence is based on a node connection tree of the distributed Wi-Fi network from a lowest leaf upward through its parents.

15. The method of claim 14, wherein the topology comprises a tree with a root node comprising a connection to a modem/router, and wherein the sequence comprises an order based on a position in the tree.

16. The method of claim 14, wherein the method is performed by a cloud service configured to manage the distributed Wi-Fi network.

17. The method of claim 14, wherein the determining comprises recognizing which nodes are within a single network and ensuring all of the nodes are updated together or not at all.

18. The method of claim 14, further comprising:
preventing the causing the update responsive to any of the plurality of nodes failing to provide the acknowledgement.

* * * * *